(No Model.)  3 Sheets—Sheet 3.
P. QUIN.
SPRING MOTOR FOR CARRIAGES.
No. 267,589. Patented Nov. 14, 1882.
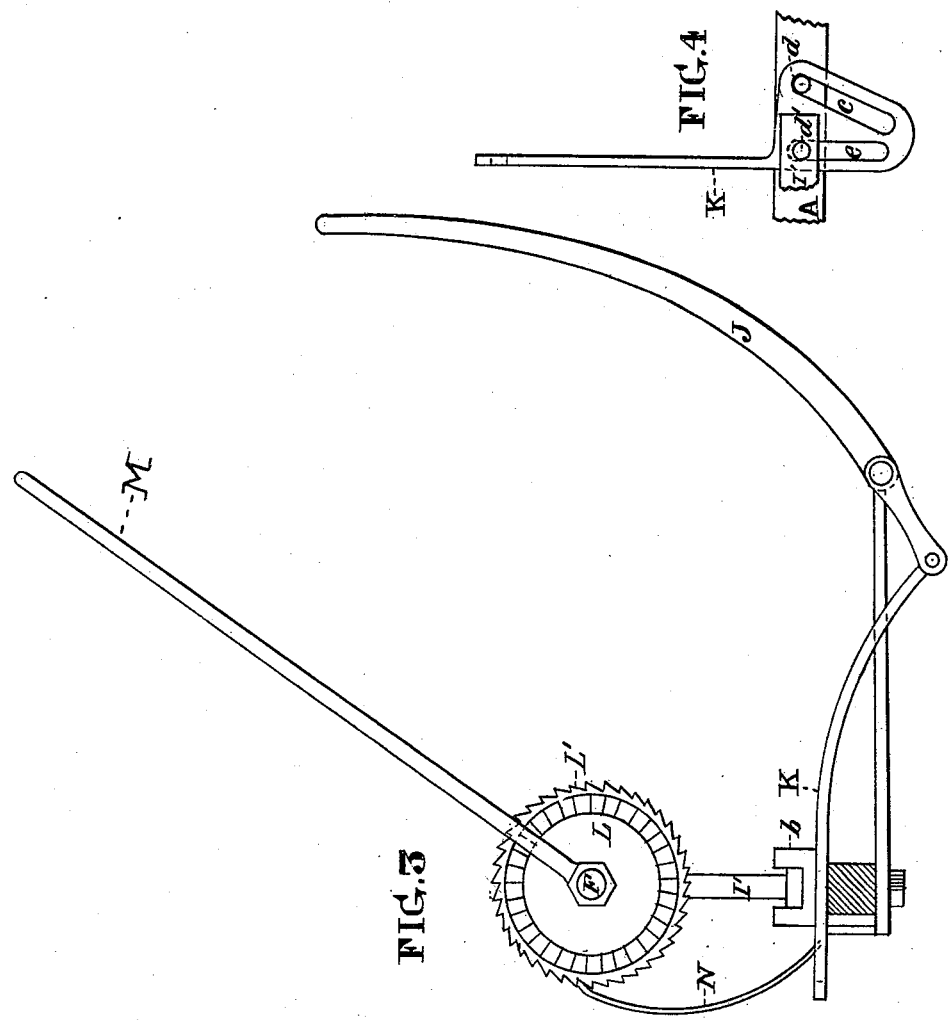
Witnesses.
Thomas J. Bewley.
H. C. Carpenter Jr.
Inventor.
Phineas Quin.
per Stephen Ustick att'y

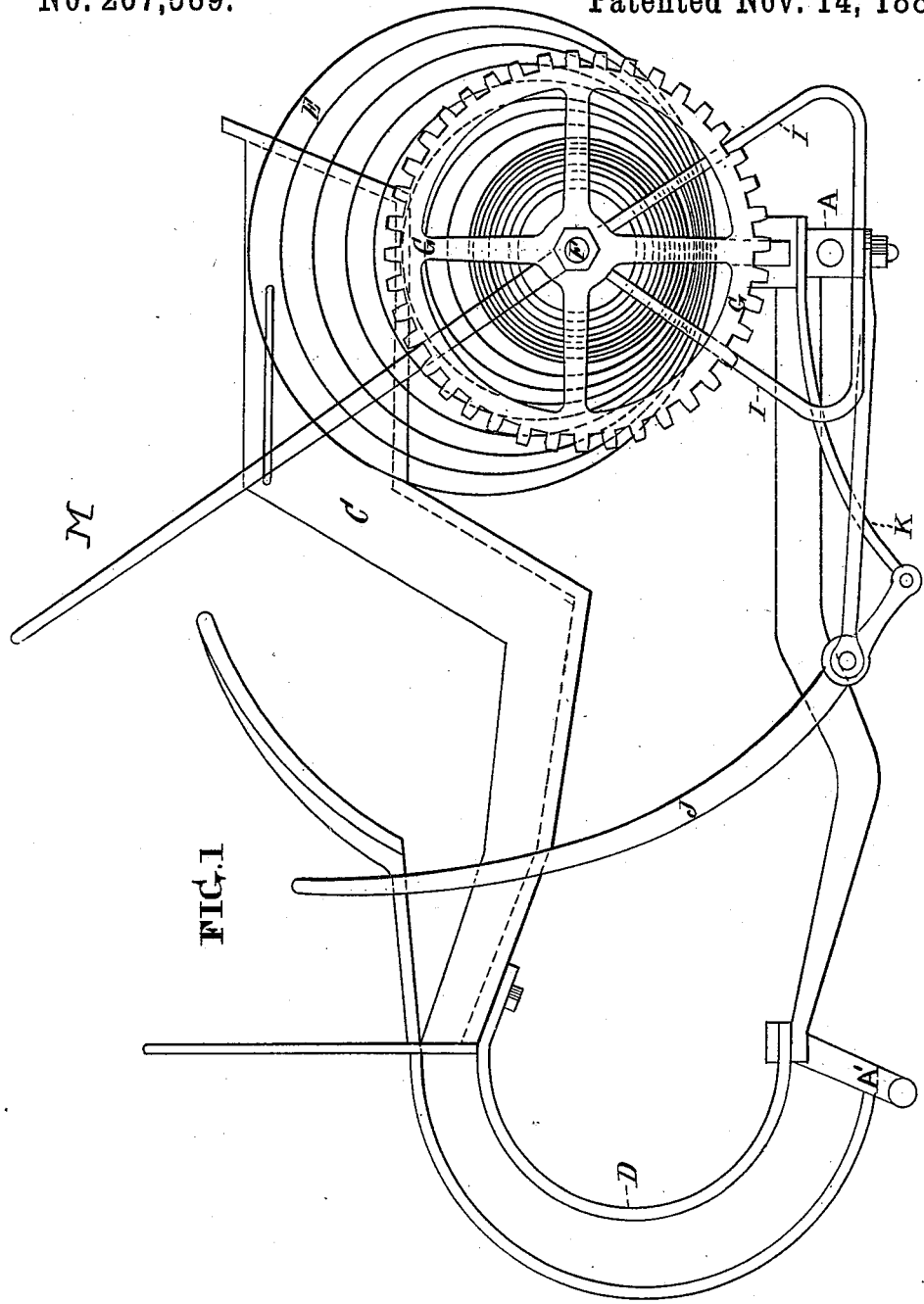

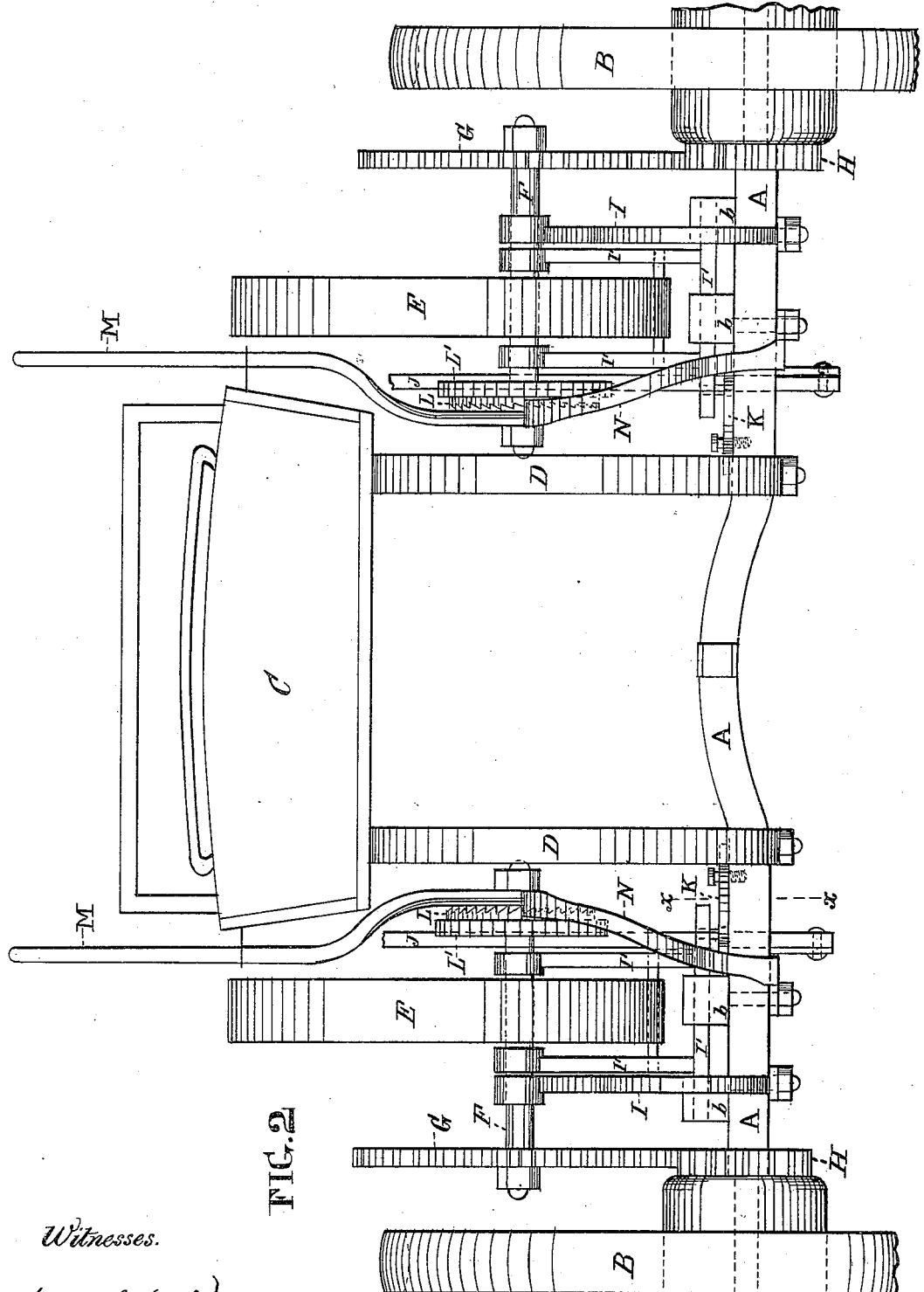

UNITED STATES PATENT OFFICE.

PHINEAS QUIN, OF TRENTON, NEW JERSEY.

SPRING-MOTOR FOR CARRIAGES.

SPECIFICATION forming part of Letters Patent No. 267,589, dated November 14, 1882.

Application filed March 3, 1882. (No model.)

*To all whom it may concern:*

Be it known that I, PHINEAS QUIN, a citizen of the United States, residing at Trenton, in the county of Burlington and State of New Jersey, have invented a new and useful Improvement in Motors for Carriages and Cars, of which the following is a specification.

The invention consists of means of throwing a spring-motor in and out of gear with the wheels of the carriage or car with which it is connected.

In the accompanying drawings, which make a part of this specification, Figure 1 is a side elevation of a carriage having my improvements connected therewith. Fig. 2, Sheet No. 2, is a rear elevation of the same. Fig. 3, Sheet No. 3, is a section taken through the axle A, showing one of the pedestals I' and parts connected therewith, the section being taken at broken line $x$ $x$. Fig. 4 is a top view of a link, K, and a portion of the axle A.

Like letters of reference in all the figures indicate the same parts.

A represents the rear axle, having wheels B B, and A' the front axle, of the carriage. C is the body of the carriage, which is suspended on springs D D D D. E E are coil-springs on the shafts F F, at each end of the axle A, by which power is given to the traction-wheels B B, each shaft F having a wheel, G, which gears into a pinion, H, on the hub $a$ of the wheel B. The said shafts F F have their bearings in their respective pedestals I and I', the former being bolted permanently to the axle A, as shown in Fig. 2, and the latter adapted to slide in the grooved guides $b$ $b$, which have stud-bolts that are passed through the axle and confined by means of nuts on the under side thereof. When the carriage is required to be stopped the wheels G G are thrown out of gear with the pinions H H by the backward movement of the levers J J, which are in reach of the rider, whereby the cam-links K K, (shown in detail in Fig. 4,) the front ends of which are pivoted to the lower ends of said levers, are pushed toward the axle A, and the cam-grooves $c$ $c$ of the links, in sliding over the projecting pins $d$ $d$ of the axle, incline the grooves $e$ $e$ toward said pins, and by their connection with the pins $d'$ $d'$, which project from the under side of the pedestals I' I', draw them toward the pins $d$ $d$, and thus disengage the gear-wheels G G from the pinions H H, and when the carriage is to be started a reverse movement is given to the levers J J to re-engage the gearing. Having two springs, E E, gives practicability to winding up for the renewal of power without stopping the carriage, by winding up the springs at different times, one of the gear-wheels G being thrown out of gear by means of its respective lever when the spring connected with its shaft F is to be wound up, and the other wheel G at another time when the other spring is to be wound, so that no time need be lost in the running of the carriage. On the inner end of each shaft F F there is a ratchet-wheel, L, with which a lever, M, is engaged when one of the springs E is required to be wound up, the lever being pushed forward successively by repeated strokes until the winding is completed. At the completion of the forward strokes the pawl N engages with the contiguous ratchet-wheel L' to prevent the backward turning of the shaft F during the reverse movements of the lever M.

I claim as my invention—

The combination of a spring-shaft, F, having a gear-wheel, G, sliding pedestal I', lever J, cam-link K, having grooves $c$ and $e$, a pin, $d$, of the axle A, and pin $d'$ of the pedestal, for throwing the said wheel in and out of gear with the pinion H on said axle, substantially as described.

PHINEAS QUIN.

Witnesses:
STEPHEN USTICK,
THOMAS J. BEWLEY.